United States Patent [19]
Quattrini

[11] Patent Number: 5,353,081
[45] Date of Patent: Oct. 4, 1994

[54] CAMERA ELEMENT POSITION DETECTING ASSEMBLAGE

[75] Inventor: Thomas J. Quattrini, Byron, N.Y.

[73] Assignee: Eastman Kodak Company, Rochester, N.Y.

[21] Appl. No.: 68,352

[22] Filed: May 27, 1993

[51] Int. Cl.⁵ .............................................. G03B 5/00
[52] U.S. Cl. ................................................ 354/195.1
[58] Field of Search ............... 354/400, 266, 195.1, 354/195.12

[56] References Cited

U.S. PATENT DOCUMENTS

| | | | |
|---|---|---|---|
| 2,782,683 | 2/1957 | Walker | 88/57 |
| 3,399,943 | 9/1968 | Barr et al. | 350/187 |
| 4,179,191 | 12/1979 | Freudenschuss et al. | 350/187 |
| 4,358,190 | 11/1982 | Sakai | 354/198 |
| 4,423,934 | 1/1984 | Lambeth et al. | 354/412 |
| 4,423,940 | 1/1984 | Kashihara et al. | 354/149 |
| 4,545,665 | 10/1985 | Aihara | 354/402 |
| 4,789,875 | 12/1988 | Wakabayashi et al. | 354/195.1 |
| 4,861,146 | 8/1989 | Hatase et al. | 350/429 |
| 4,881,799 | 11/1989 | Ohno et al. | 350/429 |
| 4,991,944 | 2/1991 | Hirao et al. | 350/429 |
| 5,005,956 | 4/1991 | Kaneda et al. | 350/429 |
| 5,027,147 | 6/1991 | Kaneda | 354/400 |
| 5,060,001 | 10/1991 | Kaneda | 354/400 |
| 5,067,802 | 11/1991 | Orino | 359/700 |
| 5,204,709 | 4/1993 | Sato | 354/266 |

Primary Examiner—W. B. Perkey
Attorney, Agent, or Firm—Roger A. Fields

[57] ABSTRACT

A camera element position detecting assemblage for a camera element supported for movement to a plurality of positions is characterized by force exerting means for exerting a variable force which is changed in accordance with changes of position of the camera element. Also, position detecting means is provided for sensing a change of force of the force exerting means when the camera element undergoes a change of position, and for substantially determining the particular position of the camera element responsive to the change of force of the force exerting means.

4 Claims, 2 Drawing Sheets

CAMERA ELEMENT POSITION DETECTING ASSEMBLAGE

FIELD OF THE INVENTION

This invention relates generally to the field of photography, and more particularly to a camera element position detecting assemblage. Specifically, the invention relates to a lens position detecting assemblage for a zoom lens.

BACKGROUND OF THE INVENTION

It is well known to include a zoom lens in a photographic camera. A zoom lens is a variable focal length lens which can be adjusted continuously by movement of one or more groups of lens elements in the lens system. Typically, the lens system consists of positive and negative elements which undergo a change in separation to change the focal length of the zoom lens.

The prior art as exemplified by U.S. Pat. Nos. 2,782,683, issued Feb. 26, 1957, and 3,339,943, issued Sep. 3, 1968, suggests the use in a photographic camera of resistance means in the form of a potentiometer for providing various resistance values corresponding to respective positions of a zoom lens.

PROBLEM(S) TO BE SOLVED BY THE INVENTION

Available space is always a major concern when designing cameras. Hence, the use of a potentiometer for providing various resistance values corresponding to respective positions of a zoom lens is not necessarily the best choice.

SUMMARY OF THE INVENTION

According to the invention, a camera element position detecting assemblage for a camera element supported for movement to a plurality of positions, is characterized by:

force exerting means for exerting a variable force which is changed in accordance with changes of position of the camera element; and position detecting means for sensing a change of force of the force exerting means when the camera element undergoes a change of position, and for substantially determining the particular position of the camera element responsive to the change of force of the force exerting means.

Preferably, the position detecting means includes a force sensing resistor located to receive the variable force of the force exerting means to provide a variable resistance which changes in proportion to the amount of force applied to it.

Also, the camera element is supported for movement towards and away from the force sensing resistor, and the force exerting means includes spring means for exerting a compressive force against the camera element and the force sensing resistor to change the amount of force applied to the force sensing resistor as the camera element undergoes changes of position.

ADVANTAGEOUS EFFECT(S) OF THE INVENTION

It has been found that the inclusion in a photographic camera of a force sensing resistor to provide a variable resistance which changes with changes of position of a zoom lens is an efficient use of available space.

DETAILED DESCRIPTION OF THE INVENTION

The invention is disclosed as being embodied preferably in a 35 mm still camera including a zoom lens. Because the features of a zoom type camera are generally known, the description which follows is directed in particular only to those elements forming part of or cooperating directly with the invention. It is to be understood, however, that other elements may take various forms known to a person of ordinary skill in the art.

Figure 1:
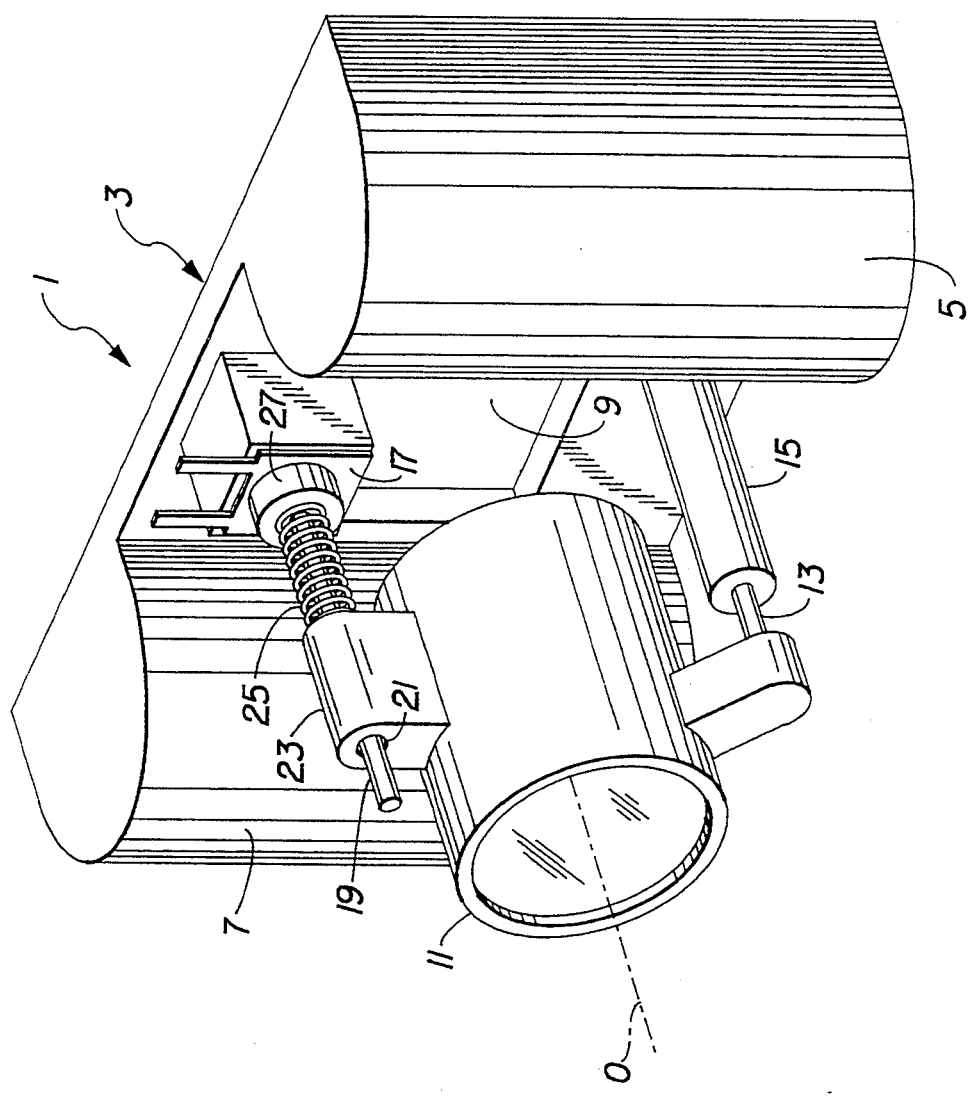
FIG. 1 is a partial front perspective view of a photographic camera according to a preferred embodiment of the invention, showing a zoom lens and a force sensing resistor.

Referring now to the drawings, FIG. 1 shows a 35 mm still camera 1 in part comprising a body section 3 having a film supply chamber 5 and a film take-up chamber 7 separated by a backframe opening 9. A known zoom or variable focal length lens 11 is supported via a shaft 13 in a sleeve 15 for movement in opposite directions along its optical axis O to a plurality of positions including an illustrated retracted or storage position closest to the backframe opening 9, a fully extended or fully deployed position farthest from the backframe opening and several partially deployed or intermediate positions between the two extreme positions. A motor, not shown, longitudinally drives the shaft 13 out of and back into the sleeve 15 to move the zoom lens 11 to its various positions.

A force sensing resistor 17 is mounted on the camera body 3 as shown in FIG. 1. The force sensing resistor 17 is a known one available from INTERLINK Electronics, Carpinteria, Calif. 93013, and is the type that provides a variable resistance which changes in inverse relation to a pressure force applied to it. A plunger 19 loosely extends through a hole 21 in a projection 23 of the zoom lens 11, permitting movement of the zoom lens without movement of the plunger. A helical compression spring 25 is coiled about the plunger 19 to continuously urge a foot 27 of the plunger against the force sensing resistor 17 regardless of the position of the zoom lens 11. Thus, the spring 25 via the foot 27 exerts a compressive force against the force sensing resistor 17 which varies in accordance with the position of the zoom lens 11. When the zoom lens 11 is in its retracted or storage position, the compressive force applied to the force sensing resistor 17 is a maximum force and the resistance value of the force sensing resistor is a minimum value. When the zoom lens 11 is in its fully extended or fully deployed position, the compressive force applied to the force sensing resistor 17 is a minimum force and the resistance value of the force sensing resistor is a maximum value. When the zoom lens 11 is in one of its several partially deployed or intermediate positions, the compressive force applied to the force sensing resistor 17 is one between the maximum and minimum forces and the resistance value of the force sensing resistor is one between the maximum and minimum values.

Figure 2:
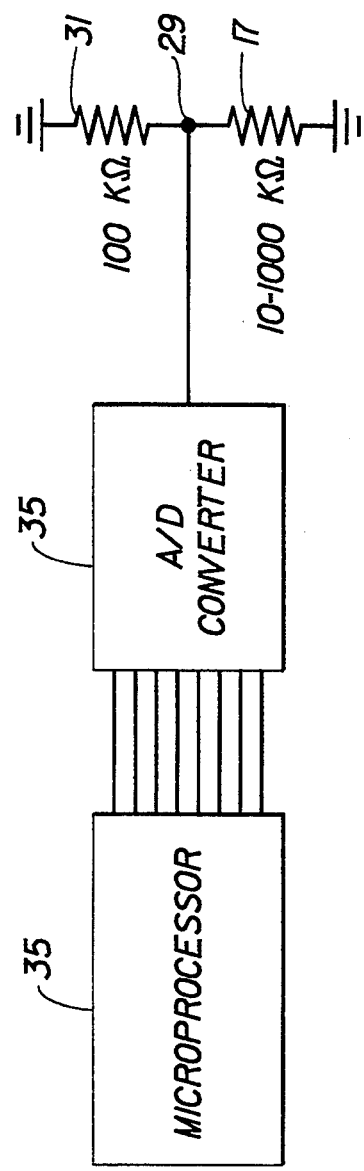
FIG. 2 is a schematic circuit diagram including the force sensing resistor.

As shown in FIG. 2, a divider 29 separates the force sensing resistor 17 and a fixed resistor 31 and is connected to an analog-to-digital (A/D) converter 33 in turn connected to a microprocessor 35. The fixed resistor 31 is connected to a voltage source, such as a battery, and the force sensitive resistor 17 is connected to ground. If the resistance value of the force sensitive resistor 17 is the minimum value because the compressive force applied to it is the maximum force, i.e. the zoom lens is in its retracted or storage position, the voltage provided to the A/D converter 33 is a minimum voltage. If the resistance value of the force sensitive resistor 17 is the maximum value because the compressive force applied to it is the minimum force, i.e. the zoom lens is in its fully deployed or fully extended position, the voltage provided to the A/D converter 33 is a maximum voltage. If the resistance value of the force sensitive resistor 17 is one between the maximum and minimum values because the compressive force applied to it is one between the maximum and minimum forces, i.e. the zoom lens is in one of its several partially deployed or intermediate positions, the voltage provided to the A/D converter 33 is one between the maximum and minimum voltages. The microprocessor 35 receives a digital representation of the voltage applied to the A/D converter 33 and has a look-up table which correlates in a known manner the digital representation of the voltage to the particular position of the zoom lens 11 to make a determination of that position.

The invention has been described with reference to a preferred embodiment. However, it will be appreciated that variations and modifications can be effected by a person of ordinary skill in the art without departing from the scope of the invention. For example, instead of the zoom lens 11 the invention can be used with other camera elements, such as a multi-stage switch or a multi-aperture diaphragm.

PARTS LIST FOR FIGS. 1 AND 2

1. camera
3. camera body
5. film supply chamber
7. film take-up chamber
9. backframe opening
11. zoom lens
13. shaft
15. sleeve
17. force sensing resistor
19. plunger
21. hole
23. projection
25. helical compression spring
27. foot
29. divider
31. fixed resistor
33. analog-to-digital converter
35. microprocessor

What is claimed is:

1. A camera element position detecting assemblage for a zoom lens supported for movement to a plurality of positions, is characterized by:

force exerting means for exerting a variable force which is changed in accordance with changes of position of said zoom lens; and position detecting means for sensing a change of force of said force exerting means when said zoom lens undergoes a change of position, and for substantially determining the particular position of said zoom lens responsive to the change of force of the force exerting means.

2. A camera element position detecting assemblage as recited in claim 1, wherein said position detecting means includes a force sensing resistor located to receive the variable force of said force exerting means to provide a variable resistance which changes in proportion to the amount of force applied to it.

3. A camera element position detecting assemblage as recited in claim 2, wherein said force sensing resistor provides a variable resistance which changes in inverse relation to the force applied against it.

4. A camera element position detecting assemblage as recited in claim 2, wherein said zoom lens is supported for movement towards and away from said force sensing resistor, and said force exerting means includes spring means for exerting a compressive force against said zoom lens and said force sensing resistor to change the amount of force applied to the force sensing resistor as said zoom lens undergoes changes of position.

* * * * *